United States Patent
Hanwella et al.

(10) Patent No.: US 12,058,137 B1
(45) Date of Patent: Aug. 6, 2024

(54) INTERNET PROTOCOL (IP) CURATOR

(71) Applicant: Wells Fargo Bank, N.A., San Francisco, CA (US)

(72) Inventors: Upul D. Hanwella, San Francisco, CA (US); Shawna K. Murphy Butterworth, Auburn, CA (US); Bryan D. Hall, Charlotte, NC (US); James Condron Hudson, Charlotte, NC (US); Christian Tobias Sorensen, Park City, UT (US); Samantha T. Grosby, St. Paul, MN (US); Nicola A. Maiorana, Charlotte, NC (US); Richard Joseph Schroeder, Charlotte, NC (US); Shailesh Hedaoo, Fremont, CA (US); William Norton Hebert, Vacaville, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 381 days.

(21) Appl. No.: 17/451,529

(22) Filed: Oct. 20, 2021

(51) Int. Cl.
  *H04L 9/40* (2022.01)

(52) U.S. Cl.
  CPC ........ *H04L 63/101* (2013.01); *H04L 63/0236* (2013.01); *H04L 63/108* (2013.01)

(58) Field of Classification Search
  CPC .. H04L 63/101; H04L 63/0236; H04L 63/108
  See application file for complete search history.

(56) References Cited

U.S. PATENT DOCUMENTS

| | | | |
|---|---|---|---|
| 7,849,507 B1* | 12/2010 | Bloch | H04L 63/168 726/22 |
| 9,071,576 B1* | 6/2015 | Earl | H04L 63/0236 |
| 10,104,107 B2 | 10/2018 | Sridhara et al. | |
| 10,721,245 B2 | 7/2020 | Song et al. | |
| 2007/0282952 A1* | 12/2007 | Lund | H04L 67/564 709/206 |
| 2010/0313264 A1* | 12/2010 | Xie | H04L 63/101 726/22 |
| 2017/0374084 A1 | 12/2017 | Inoue et al. | |
| 2018/0145986 A1 | 5/2018 | Chien | |
| 2019/0158501 A1* | 5/2019 | Peppe | H04L 63/107 |

FOREIGN PATENT DOCUMENTS

| | | |
|---|---|---|
| CN | 103634315 | 3/2014 |
| CN | 105141604 | 12/2015 |
| CN | 106778331 | 5/2017 |
| CN | 112395600 | 2/2021 |
| EP | 2278516 | 1/2011 |

\* cited by examiner

*Primary Examiner* — Amie C. Lin
(74) *Attorney, Agent, or Firm* — SCHWEGMAN LUNDBERG & WOESSNER, P.A.

(57) ABSTRACT

Systems and methods may generally be used to automatically curate a blocklist of internet protocol (IP) addresses. An example method may include using risk factor scores for a particular IP address that was blocked by a traffic control component to determine whether to add the particular IP address to a blocklist. The example method may include, in response to a determination to add the particular IP address to the blocklist, generating an IP address entry in the blocklist for the particular IP address, the IP address entry optionally including a corresponding time-based expiration. The example method may include outputting the blocklist or the IP address entry, such as in response to a request from a firewall.

20 Claims, 5 Drawing Sheets

BLOCKLIST

| ENTRY NUMBER | IP ADDRESS | BLOCK STATUS | TIME DATA | NOTES |
|---|---|---|---|---|
| 1 | 0.12.152.7 | BLOCK | 5 MINUTES EXPIRATION | FIRST INSTANCE |
| 2 | 0.149.23.201 | BLOCK | 23 MINUTES EXPIRATION | THIRD INSTANCE |
| 3 | 10.10.127.244 | BLOCK | EXPIRATION AT 4:23PM | NONE |
| 4 | 127.212.212.84 | PAROLE | 6 HOURS EXPIRATION | FIRST PAROLE |
| 5 | 127.240.240.12 | BLOCK | 23 SECONDS EXPIRATION | FIRST INSTANCE |
| ... | ... | ... | ... | ... |
| 7,048 | 192.0.0.1 | ALLOW | NONE | MANUAL OVERRIDE |

*FIG. 3*

INTERNET PROTOCOL (IP) CURATOR

BACKGROUND

Internet protocol (IP) traffic is rife with malicious traffic attempting to infiltrate or damage systems. Malicious actors may attempt to jam a system (such as with a distributed denial of service attack (DDOS)), to obtain unauthorized entry to a system (such as by brute force attacks), or to perform other undesirable actions. However permanently blocking a malicious IP address may not be a reliable solution when the IP address may be dynamic, part of a public network, or otherwise have legitimate traffic as well.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 illustrates an example blocklist in accordance with some embodiments.

DETAILED DESCRIPTION

Figure 1:
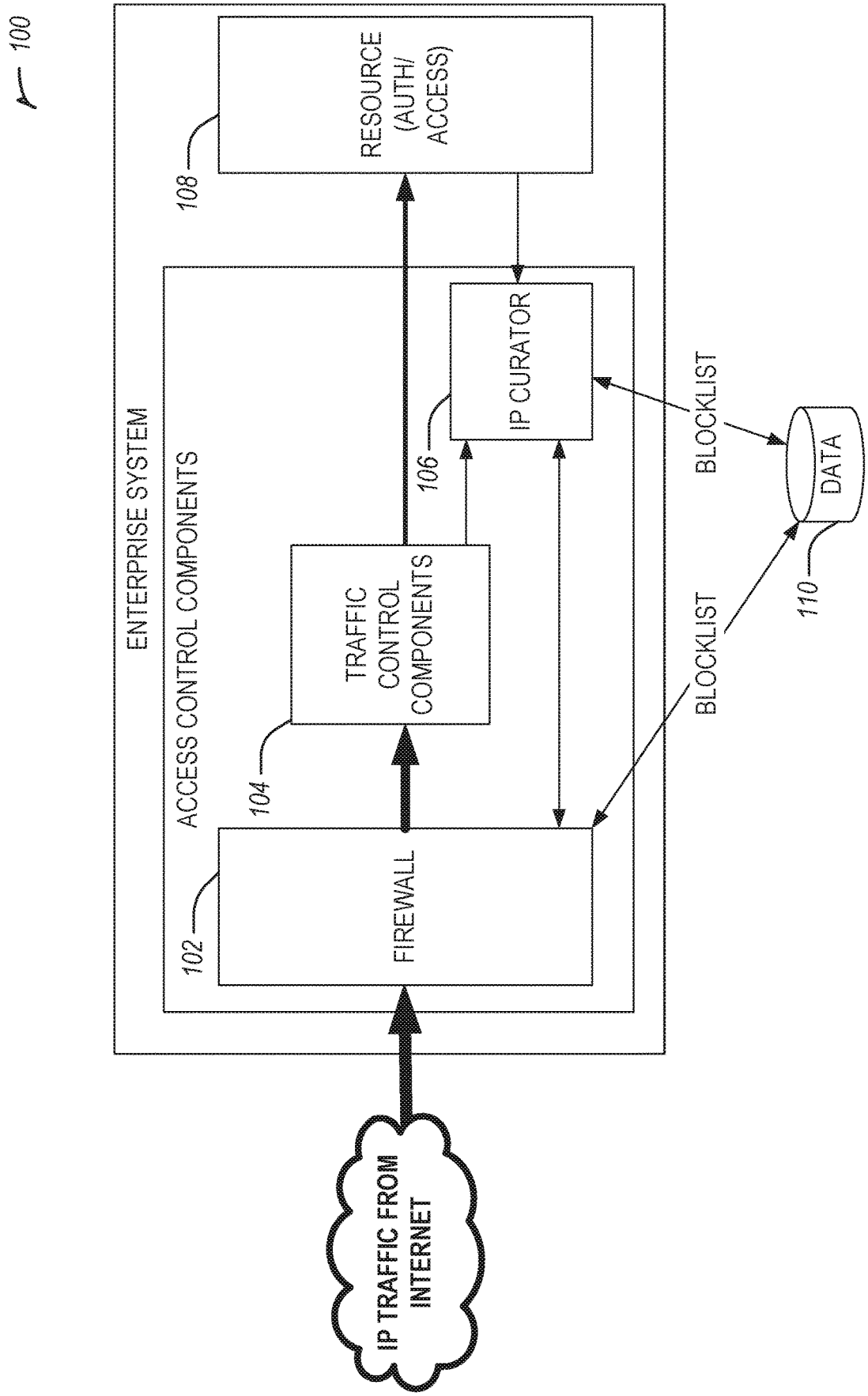
FIG. 1 illustrates a system for automated blocklist curating at an enterprise system in accordance with some embodiments.

The systems and methods described herein may be used to generate or update a blocklist for IP addresses using an IP curator. The IP curator is a hardware, software, or firmware component or set of components (e.g., implemented in hardware using a processor and memory, for example) component that receives information about network traffic of IP addresses, and determines whether to place an IP address on the blocklist. The IP curator may receive risk factor scores from traffic control components (e.g., components that filter IP traffic based on different techniques for determining whether the traffic is malicious). The risk factor scores may be aggregated to determine whether to add the IP address to the blocklist. The blocklist may be accessed by a firewall to block the IP address in a more efficient manner that relying on blocking by the traffic control components. Blocking the IP address at the firewall reduces computing resource usage and speeds up the functioning of an enterprise system for managing IP traffic by removing the IP address from consideration, when malicious. These systems and methods result in a better functioning network as well, such as by limiting false positives. Time limits on IP address entries in the blocklist may further reduce consequences of false positives, and increase functioning of the network.

While many sophisticated techniques exist for filtering IP traffic, they often consume significant resources or may cause innocent traffic to be blocked. The systems and methods discussed herein may prevent over filtering, while also reducing resource load by blocking IP addresses at a firewall for a limited period of time using a blocklist maintained by an IP curator.

In various examples, IP addresses may be blocked from logging into a server (e.g., a website) for a variety of reasons. One reason is to stop account validators from testing leaked password/username combinations to see if they work before selling them. One problem with blocking IP addresses is that the IP addresses may be part of a corporate proxy, mobile network hubs, coffee shop wifi, etc., in which most of the traffic is valid. By using a blocklist with a time limit for entries, the malicious traffic may be stopped without significantly burdening the appropriate traffic.

An IP curator may consolidate and filter the blocklist at a high level of confidence (e.g., based on thresholds) to blocking IP addresses at a higher place in the network stack (e.g., the firewall). A source of the IP address traffic information may come from pre-auth layer controls, such as vendor or internal traffic control components, which are used for detection activity of malicious traffic. While the controls at the pre-auth layers have nuanced handling for limiting the effect of false positives on good customers, a block at the higher stack devices may not have that capability, and the IP curator may be used to determine whether an IP address is bad enough with a high enough confidence to warrant inclusion in the blocklist.

The IP curator solution may aggregate and judge all IP addresses from all controls for inclusion on the blocklist. In an example, the IP curator may track changes for each client (e.g., firewalls). Entries in the blocklist may include "time to live" information, which may be made available to a firewall, such as when the firewall is configured to use the "time to live" information. The IP curator may provide the full blocklist or a change log upon request. Data generated, stored, and aggregated at the IP curator may be logged and saved, such as for later use by the IP curator or for use by a traffic control component. The IP curator may be accessed via a user interface (UI) in some examples, such as for monitoring or manual override of a blocked IP address. In an example, the IP curator includes security control of access to the service, such as according to Mutually Authenticated SSL (MASSL), or the like.

The IP curator may aggregate IP addresses based on detected malicious activity. Different traffic control components may block an IP address, output a risk factor score to the IP curator, and optionally include a confidence level of the score. In an example, each traffic control component may have its own algorithm for detecting a risk factor score. The IP curator may determine whether a blocked IP address is a high risk for more than one of the traffic control components, (e.g., two or more traffic control components), above a particular rating (e.g., 2 or more at 85/100 or higher), or the like. In response to determining IP addresses that were blocked and represent a high risk, the IP curator may generate, update, or publish a blocklist with the malicious IP addresses. In response to a call (e.g., from a firewall), the IP curator sends the list of malicious IP addresses to the entity requesting the call.

For determining whether an IP address is malicious, various techniques may be used. For example, a traffic control components may check whether a user has ever authenticated from the IP address, whether the authentication was recent, a number of attempts before successful authentication, etc. Each traffic control component may aggregate information, run an algorithm, and outputs a risk factor score for an IP address. The IP curator may consider risk factor scores even when an IP address is not blocked by a particular traffic control component or any traffic control components. The IP curator may aggregate each risk factor score from the traffic control components (which may be weighted). The IP curator generates IP address entries in a blocklist of based on the aggregated scores, and outputs the blocklist in response to a call. The IP curator may remove an IP address from blocklist or modify an entry for an IP address. In some examples, the IP curator or the traffic control components may use other data in consideration of whether to place an IP address on a blocklist or to block the IP address, respectively. The other data may include pre-authentication data, such as third party vendor watchlists, malicious IP blocks, etc.

In an example, the blocklist or entries in the blocklist may include a timeout period after which the blocklist is revoked or an entry is removed. In an example, an IP address automatically drops off the blocklist after a specified period of time.

FIG. 1 illustrates a system for automated blocklist curating at an enterprise system 100 in accordance with some embodiments. The enterprise system 100 includes access control components for filtering access of IP traffic to a resource 108. The access control components include a firewall 102, traffic control components 104, and an IP curator 106. Other access control components may be used, and the order and arrangement of the access control components is presented as an example, and other orders or arrangements may be used. As shown in FIG. 1, data flows from the internet to the firewall 102, which blocks some traffic (represented by a smaller data flow arrow going from the firewall 102 to the traffic control components 104). Similarly, the traffic control components 104 block some IP traffic. The firewall 102 and the traffic control components 104 may respond to different types of threats, block IP traffic based on different algorithms, or block with different frequencies. For example, the firewall 102 may protect against distributed denial of service (DDOS) attacks, while the traffic control components 104 may filter out individual IP addresses. In other examples, the firewall 102 may filter individual IP addresses or the traffic control components 104 may filter out blocks of IP addresses.

The access control components include an IP curator 106, which receives data regarding blocked IP addresses from the traffic control components 104 or the firewall 102. The IP curator 106 may include processing circuitry to determine whether an IP address that was blocked by one of the traffic control components 104 may be blocked in the future by the firewall 102, in an example. The IP curator 106 may generate a blocklist of IP addresses or make changes to a blocklist of IP addresses based on information from the traffic control components 104 or the firewall 102. The blocklist may be stored in memory (e.g., of the IP curator 106, in a database 110, at the firewall 102, etc.). The blocklist may be accessed by the firewall 102, for example as a call or request periodically, such as once a day, or as updates occur.

As IP traffic flows from the internet, through the firewall 102, to the traffic control components 104, and eventually to the resource 108, the IP traffic is filtered. Filtering may occur for a variety of reasons, such as to prevent malicious actors from engaging with the resource 108 (e.g., when attempting to gain unauthorized access to an account, for an attack on system resources, to plant malware, or the like). When an IP address is blocked by the firewall 102 or one of the traffic control components 104, a log entry may be generated. The log entry may be sent to the IP curator 106 or one of the traffic control components 104 for further evaluation. For example, the log entry may be considered by the IP curator to determine whether to add the associated IP address to the blocklist. The log entry may be used by ones of the traffic control components 104 to refine filtering algorithms, in some examples, such as when the IP address is later identified as safe (e.g., by manual override or later non-malicious activity). In an example, the resource 108 may send information to the curator 106 or create a log entry related to authentication or access attempts. For example, login failures, successful logins, other accesses (e.g., interactions with a website that do not require authentication), or the like may be logged or sent to the IP curator 106. The IP curator 106 may use this information in determining whether to add the IP address to the blocklist.

The traffic control components 104 may generate a risk factor score when blocking an IP address. The risk factor score may indicate a degree of risk from the network activity of the IP address. For example, on a scale of 0 to 100, 0 may correlate to no chance of risk from the IP address (e.g., an in-network IP address), while 100 may correlate to a clearly malicious IP address, with values between 0 and 100 representing relatively lower or higher degrees of risk. The IP curator 106 may use a risk factor score to evaluate whether to place the IP address on the blocklist. For example, when the risk factor score exceeds a threshold (e.g., a minimum risk factor score), the IP curator 106 may place the IP address on the blocklist. In some examples, the IP curator 106 may consider how many of the traffic control components 104 blocked the IP address when determining whether to place the IP address on the blocklist. In an example, considerations by the IP curator 106 for placing an IP address on the blocklist may include a minimum number of the traffic control components 104 blocking the IP address, a minimum risk factor score from one or multiple of the traffic control components 104, an aggregated risk factor score (e.g., an average, a medium, a weighted average, etc.), or the like. In an example, an aggregated risk factor score may be weighted according to whether a component risk factor score issued by a traffic control component blocked the IP address or not, a confidence level of the traffic control component issuing the component risk factor score, a performance score of the traffic control component issuing the component risk factor score, past interactions with the IP address (e.g., whether the IP address has been blocked before, whether the IP address has previous successful or unsuccessful login attempts, etc.), or the like.

When the IP curator 106 determines that an IP address is to be placed on the blocklist, the IP curator 106 may create the blocklist (e.g., a new version) or may save an update to the blocklist, such as by adding or updating an IP address entry corresponding to the IP address. The IP address entry may include an indication of the IP address and an optional time expiration for inclusion of the IP address on the blocklist. The time expiration may include a time period (e.g., 5 minutes, 20 minutes, 1 hour, 6 hours, 1 day, etc.) or an expiration day or time (e.g., 12:05 pm on mm/dd/yyyy). The time expiration may be dynamic in the sense that the IP curator 106 may set the time expiration when updating or generating the IP address entry, or may change the time expiration after creating or updating the IP address entry. The time expiration may be determined based on historical data related to the IP address. In an example, for repeated malicious actions (e.g., the IP address is blocked more than once), the time expiration may be increased at each subsequent placement on the blocklist. For example, on a first placement on the blocklist, the time expiration may be 5 minutes. After the 5 minutes, if the IP address is again determined to go on the blocklist, the time expiration may be increased (e.g., doubled) to 10 minutes. In some examples, the time expirations may be increased based on other historical data as well, such as previous authorized actions (e.g., a successful login) or unsuccessful logins. The time expiration may be linear (e.g., increase by 5 minutes each time), parabolic (e.g., doubling each time), or arbitrary (e.g., preset by a user, randomly increased, etc.).

When an IP address is placed on the blocklist, the firewall 102 may access the blocklist (e.g., directly from the IP curator 106, such as via an API, via the database 110, etc.). The firewall 102 may then block the IP address based on the blocklist. This prevents traffic from the IP address from reaching the traffic control components 104, which saves time and resources (e.g., the traffic control components 104 may require more resources than the firewall 102). This may also prevent the IP address from reaching the resource 108 accidentally (e.g., if the traffic control components 104 fail or have an error allowing the traffic to pass). In some examples, the IP curator 106 may push the blocklist to the database 110 or the firewall 102 (e.g., when a change is made to the blocklist, such as adding or updating an IP address entry, time expiration, etc.).

In some examples, the IP curator 106 may remove the IP address entry from the blocklist, such as after a time limit has expired. Once removed, the IP address may pass through the firewall 102 (e.g., the firewall 102 may receive an updated blocklist or an update to the blocklist that no longer indicates that the IP address is to be blocked). However, even though the IP address passes through the firewall 102, it may still be subject to ordinary firewall blocking activity. The IP address then is filtered through the traffic control components 104, which may again block the IP address, or let the traffic through to the resource 108. When the IP address is blocked again by one or more of the traffic control components 104, the IP curator 106 may place the IP address on the blocklist again. The rules used by the IP curator 106 for a second blocking event may differ than for a first or initial blocking event. For example, the IP curator 106 may use a lower threshold for an aggregated risk factor score, use a lower minimum number of traffic control components 104 blocking the IP address, or the like. In an example, the IP curator may place the IP address on the blocklist for a second blocking by any of the traffic control components 104, regardless of risk factor scores or blocking by others of the traffic control components 104. When the IP curator 106 places the IP address on the blocklist again, the time expiration may be increased, as discussed above.

After the IP curator 106 removes the IP address from the blocklist, the IP curator 106 may consider a parole period for the IP address. This parole period may include an entry on the blocklist as an indication of the IP address and a parole timer, or may be stored off the blocklist (e.g., locally at the IP curator 106). The parole timer may indicate a period of time where the IP address remains under stricter scrutiny than a typical unknown IP address. During the parole time, the IP curator 106 may consider the IP address under the lower thresholds and rules discussed above. When the parole time expires, the IP curator 106 may return to considering the IP address without the elevated scrutiny. In some examples, even after expiration of the parole time, the IP address may face greater scrutiny than a typical unknown IP address due to consideration of historical data by the IP curator 106. The parole period may be a function of offense number (e.g., increasing from first blocking to second blocking, and increasing further from second to third, etc.), blocklist time expiration (e.g., 5 minutes of blocking may correspond to 1 hour of parole, 10 minutes of blocking may correspond to 6 hours of parole, 20 minutes of blocking may correspond to 24 hours of parole, etc.), a preset parole time schedule, or the like.

In an example, the IP curator 106 may implement an automated rule for determination of whether to place an IP address on the blocklist. In another example, the IP curator 106 may include a classifier to designate whether the IP address is malicious or not, and determine whether to place the IP address on the blocklist based on the classifier's output. In yet another example, the IP curator 106 may use a machine learning trained model to determine whether to place the IP address on the blocklist. In this example, the model may be trained based on previous traffic, such as with data labeled as malicious or not, risk factor scores, confidence probabilities, network traffic, or the like.

An example rule the IP curator 106 may implement includes: when an aggregated risk factor score exceeds a threshold, place the IP address in the blocklist. Another example rule includes: when an aggregated risk factor score exceeds a threshold and a minimum number of the traffic control components 104 have blocked the IP address, place the IP address in the blockchain. Yet another example rule includes: when no previous successful authenticated session has occurred via the IP address within the previous 14 days and an aggregated risk factor score exceeds a threshold, place the IP address in the blocklist. Still another example rule includes: when a majority of or all traffic control components 104 block the IP address, place the IP address in the blocklist. Various combinations of components of these rules may be used in some examples.

Figure 2:
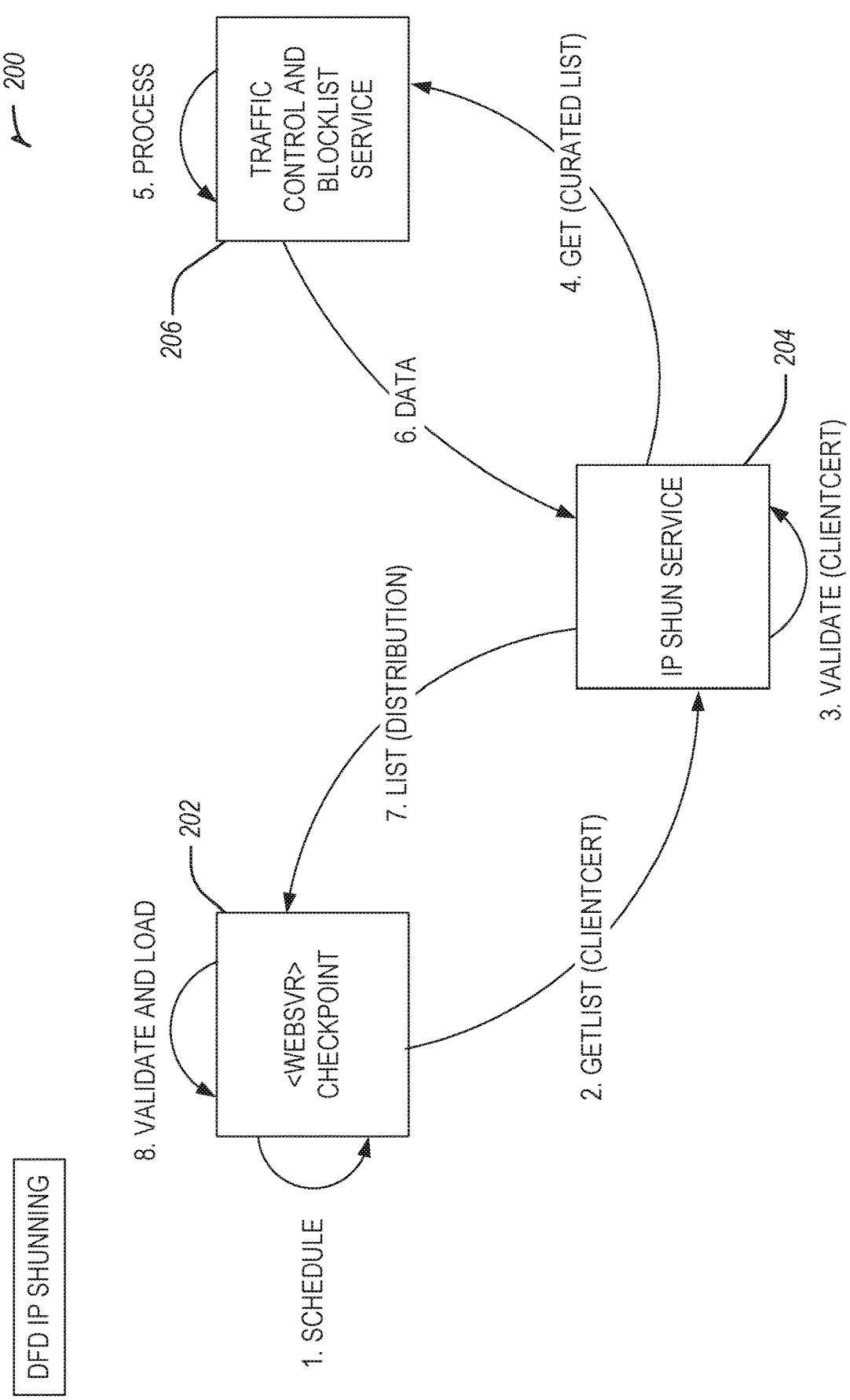
FIG. 2 illustrates a block diagram for internet protocol (IP) traffic in accordance with some embodiments.

FIG. 2 illustrates a block diagram 200 for internet protocol (IP) traffic in accordance with some embodiments. The block diagram 200 includes a checkpoint 202 (e.g., a webserver, a firewall, a security policy enforcement system such as a proxy, a load balancer, a denial of service mitigation device, or the like), an IP shun service 204, and a traffic control and blocklist service 206. The block diagram 200 illustrates a data flow between the blocks, which may be initiated by the checkpoint 202. The IP shun service 204 may act as an intermediary between the checkpoint 202 and the traffic control and blocklist service 206. An IP curator (e.g., 106 of FIG. 1) may be embodied in the traffic control and blocklist service 206 or be a part of the traffic control and blocklist service 206. In some examples, the IP shun service 204 may be part of an IP curator or may be separate.

The checkpoint 202 generates a job schedule, such as by using cron, for example in minutes. The checkpoint 202 then sends a request to the IP shun service 204 to obtain a blocklist. The GetList request may be performed using curl, including information validating the checkpoint 202 and information related to the request. The GetList request may include validation information to validate the IP shun service 204, a key related to the identity of the checkpoint 202, an identifier (e.g., a universally unique identifier (UUID)) for the request, or a timestamp. The IP shun service 204 may validate the checkpoint 202 at operation 3.

The IP shun service 204 sends a Get request (Get at operation 4) to the traffic control and blocklist service 206 based on the request from the checkpoint 202. The Get request may include a client certification or identity of the IP shun service 204, a request identifier or timestamp (e.g., from the checkpoint 202), or an identity of the webserver checkpoint 204. The traffic control and blocklist service 206 may process a curated list (e.g., generated or maintained at the traffic control and blocklist service 206) to generate a blocklist or update to a blocklist to send to the IP shun service 204. At operation 6, response data is sent to the IP shun service 204 from the traffic control and blocklist service 206, including the identity of the checkpoint 202 (e.g., for traceability) or a sequence number (e.g., an automatically incremented sequence number generated for the webserver checkpoint 204 by the traffic control and blocklist service 206). Data may be sent from the traffic control and blocklist service 206 including an IP address or set of IP addresses (e.g., an IP address in each new line).

The IP shun service 204 may respond to the checkpoint 202 with a list of IP addresses (e.g., a list distribution or file fetch). The list may be sent via HTTP query or with another format. The data sent to the checkpoint 202 may mimic a file download, in an example. Metadata may be included, such as the UUID or other identifier, the sequence number, the timestamp, or the like. The checkpoint 202 may validate and load the blocklist after receiving it from the IP shun service 204. In an example, the checkpoint 202 may perform checks prior to loading, such as determining whether the sequence number is correct (e.g., current), determining whether the data is a new blocklist or includes an update to a previous blocklist, or determining enforcement times for IP addresses (e.g., enforcement time for a blocklist or for individual entries).

In an example, an aspect of security policy enforcement includes feedback to the systems and mechanisms used to curate the block list. The IP shun service 204 may be notified when there are issues downloading the block list, implementing the list, or blocking traffic. Feedback may be accomplished via several mechanisms. Security enforcement logs include tags, so the curation process may analyze and identify when IPs that are in the block list attempt to access the network. In an example, a query or alert (e.g., Simple Network Management Protocol (SNMP) queries or alerts) may be used to identify when the enforcement process stops working or is unable to fetch updates. Feedback information may be used for troubleshooting, reporting, or confirmation that enforcement remains operational.

FIG. 3 illustrates an example blocklist in accordance with some embodiments. The example blocklist is shown in a human-readable format, and may be stored in a machine-readable format. For example, rather than saving words in various entries, logical bits may be stored. Similarly, rather than storing numbers in base 10, base 2 bits or hexadecimal bits may be stored. In an example, pointers or other logical expressions may be used.

The example blocklist is shown with various entries, each entry optionally including an IP address, a block status, time data, or notes. Example entries are shown in the example blocklist, such as entry 1. In entry 1, an IP address (0.12.152.7) is stored, along with a current block status of "BLOCK," which indicates that the IP address is to be blocked (e.g., by a firewall when considering the example blocklist). Entry 1 further includes time data, including an expiration time of 5 minutes. After the expiration time expires, the time data or the block status may be changed (e.g., from "BLOCK" to "ALLOW" or "PAROLE", or the time data may change to none or a parole time), or the entire entry 1 may be removed from the example blocklist. Entry 1 includes notes, which may indicate log data, metadata, or other information to be used in future consideration of whether to block the IP address (e.g., by an IP curator). Specifically, entry 1 states that this is a 'first instance' in the example blocklist for this IP address (e.g., the first time this IP address has been blocked, or has been blocked in a particular time period, such as the last 14 days). This information may be stored and used for adjusting time data if a future blocking attempt occurs. For example, in entry 2, a longer time expiration is included due to this being the 'third instance' on the example blocklist of entry 2.

Entry 3 includes a different type of time data, including an expiration time rather than a countdown like entries 1 and 2. Entry 3 does not include any notes, which may be due to a lack of information, or storage of this information elsewhere. Entry 4 represents an example parole entry. The block status for entry 4 includes "PAROLE," indicating that should another blocking or questionable traffic event occur with respect to IP address 127.212.212.84, the status may change to "BLOCK." In some examples, the parole data is stored on a separate list (e.g., a parole list) rather than in the example blocklist. Entry 4 has a longer time expiration of 6 hours, because it is a parole entry rather than a block entry. Although entry 4 appears on the example blocklist, network traffic from the IP address of entry 4 may still be permitted through to a resource (e.g., not blocked). Entry 4 includes a note that this is a first parole. In some examples, subsequent paroles may include longer time expirations. Entry 5 is another example of a "BLOCK" entry.

Entry 7,048 illustrates an example of an IP address that has been explicitly allowed. This entry is shown in the example blocklist, but this type of entry may be saved somewhere other than in the example blocklist, such as in a separate allowlist (e.g., as accessible by an IP curator), in some examples. Entry 7,048 may include an IP address that was blocked or paroled, but that has been subject to a manual override to allow traffic from the IP address. This may occur when blocking happens accidentally or to legitimate traffic that appeared malicious due to some circumstances. The manual override may be performed by a user writing to the example blocklist or sending a message to an IP curator that controls the example blocklist.

The example blocklist shown in FIG. 3 may be dynamic, for example changing to update time data (e.g., when accessed, in real-time, periodically, etc.), removing or adding entries, modifying entries (e.g., changing the parole entry 4 to block), or the like. The example blocklist may be published for a firewall to retrieve. In an example, the example blocklist is published in full periodically (e.g., once a day), and subsequent changes trigger a change log to be published.

Figure 4:
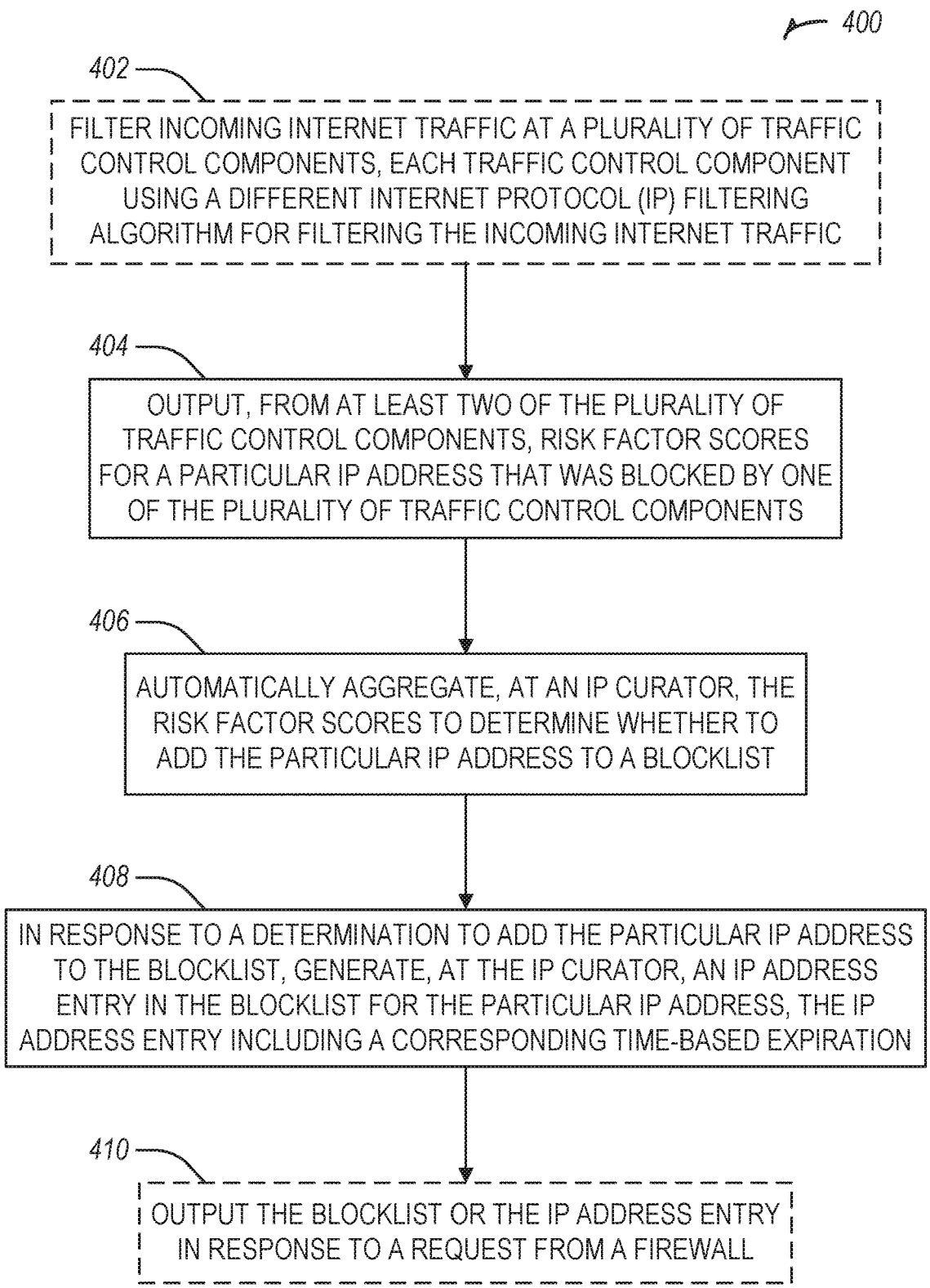
FIG. 4 illustrates a flowchart showing a technique for automated blocklist curating at an enterprise system managing a website in accordance with some embodiments.

FIG. 4 illustrates a flowchart showing a technique 400 for automated blocklist curating at an enterprise system managing a website in accordance with some embodiments. In an example, operations of the technique 400 may be performed by processing circuitry, for example by executing instructions stored in memory. The processing circuitry may include a processor, a system on a chip, or other circuitry (e.g., wiring). For example, technique 400 may be performed by processing circuitry of a device (or one or more hardware or software components thereof), such as those illustrated and described with reference to FIG. 1.

The technique 400 includes an optional operation 402 to filter incoming internet traffic at a plurality of traffic control components, each traffic control component using a different internet protocol (IP) filtering algorithm for filtering the incoming internet traffic. Operation 402 may include filtering incoming internet traffic using the plurality of traffic control components before authentication of a user at the website.

The technique 400 includes an operation 404 to output, from at least two of the plurality of traffic control components, risk factor scores for a particular IP address that was blocked by one of the plurality of traffic control components. In an example, a traffic control component may be internal to the enterprise system or may be a third-party traffic control component external to the enterprise system.

The technique 400 includes an operation 406 to automatically aggregate, at an IP curator, the risk factor scores to determine whether to add the particular IP address to a blocklist. The technique 400 includes an operation 408 to in response to a determination to add the particular IP address to the blocklist, generate, at the IP curator, an IP address entry in the blocklist for the particular IP address, the IP address entry including a corresponding time-based expiration.

The technique 400 includes an optional operation 410 to output the blocklist or the IP address entry in response to a request from a firewall. Operation 410 may include outputting an update for the IP address entry corresponding to a change since a last sent version of the blocklist or a last sent update to the blocklist. The technique 400 may include blocking a request from the IP address at the firewall before the request reaches any of the plurality of traffic control components. In an example, operation 410 uses an IP shun service to retrieve the blocklist from the IP curator to send to the firewall (e.g., in response to a request from the firewall or a time period expiration).

In an example, the technique 400 includes an operation to remove, using the IP curator, the IP address entry from the blocklist in response to completion of the corresponding time-based expiration. In this example, the technique 400 may include receiving second risk factor scores corresponding to the particular IP address at a second time. The second risk factor scores may be used to re-add the IP address entry to the blocklist for the particular IP address, including optionally modifying the corresponding time-based expiration to increase time of the particular IP address on the blocklist. In this example, the technique 400 may include, after removing the IP address entry from the blocklist, generating a parole entry in the blocklist for the particular IP address, the parole entry including a parole time, during which the IP address entry is automatically re-added to the blocklist in response to a security parameter trigger. A security parameter trigger may include at least one of one of the plurality of traffic control components blocking the IP address, one of the plurality of traffic control components indicating a risk factor score above a first threshold, an increase in traffic from the IP address, a failed authentication attempt from the IP address, a cumulative risk factor score from the plurality of traffic control components above a second threshold or the like.

The technique 400 may include receiving a manual override allowing access by the IP address, and in response, removing the IP address entry from the blocklist and preventing the IP address from being added back to the blocklist for at least a minimum time period.

Figure 5:
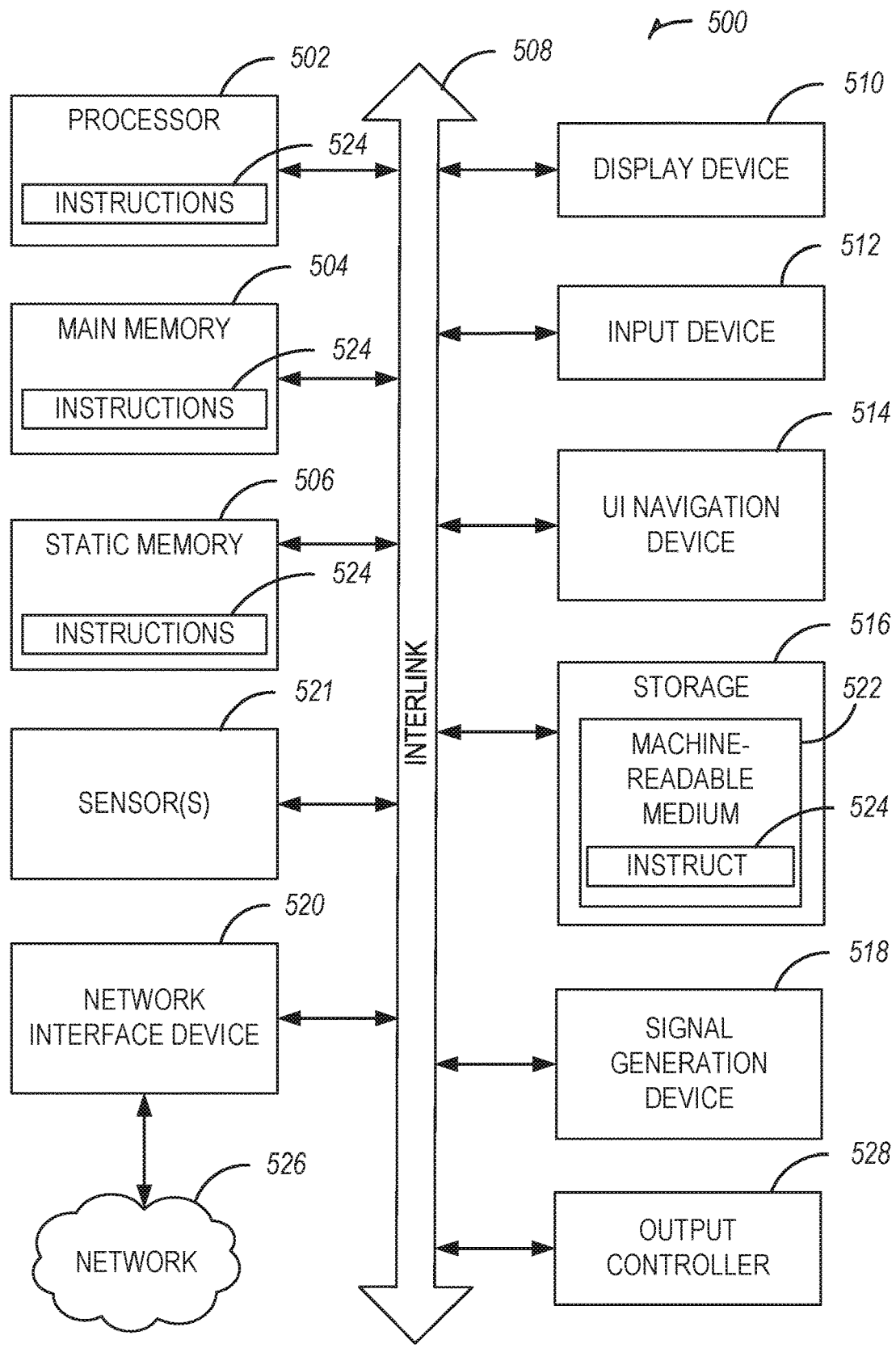
FIG. 5 illustrates generally an example of a block diagram of a machine upon which any one or more of the techniques discussed herein may perform in accordance with some embodiments.

FIG. 5 illustrates generally an example of a block diagram of a machine 500 upon which any one or more of the techniques (e.g., methodologies) discussed herein may perform in accordance with some embodiments. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

The following, non-limiting examples, detail certain aspects of the present subject matter to solve the challenges and provide the benefits discussed herein, among others.

Example 1 is a method for automated blocklist curating at an enterprise system managing a website, the method comprising: filtering incoming internet traffic at a plurality of traffic control components, each traffic control component using a different internet protocol (IP) filtering algorithm for filtering the incoming internet traffic; outputting, from at least two of the plurality of traffic control components, risk factor scores for a particular IP address that was blocked by one of the plurality of traffic control components; automatically aggregating, at an IP curator, the risk factor scores to determine whether to add the particular IP address to a blocklist; in response to a determination to add the particular IP address to the blocklist, generating, at the IP curator, an IP address entry in the blocklist for the particular IP address, the IP address entry including a corresponding time-based expiration; and outputting the blocklist or the IP address entry in response to a request from a firewall.

In Example 2, the subject matter of Example 1 includes, removing, using the IP curator, the IP address entry from the blocklist in response to completion of the corresponding time-based expiration.

In Example 3, the subject matter of Example 2 includes, receiving second risk factor scores corresponding to the particular IP address at a second time; re-adding, based on the second risk factor scores, the IP address entry to the blocklist for the particular IP address, including modifying the corresponding time-based expiration to increase time of the particular IP address on the blocklist.

In Example 4, the subject matter of Examples 2-3 includes, after removing the IP address entry from the blocklist, generating a parole entry in the blocklist for the particular IP address, the parole entry including a parole time, during which the IP address entry is automatically re-added to the blocklist in response to a security parameter trigger.

In Example 5, the subject matter of Example 4 includes, wherein a security parameter trigger includes at least one of one of the plurality of traffic control components blocking the IP address, one of the plurality of traffic control components indicating a risk factor score above a first threshold, an increase in traffic from the IP address, a failed authentication attempt from the IP address, or a cumulative risk factor score from the plurality of traffic control components above a second threshold.

In Example 6, the subject matter of Examples 1-5 includes, wherein filtering the incoming internet traffic includes filtering incoming internet traffic using the plurality of traffic control components before authentication of a user at the website.

In Example 7, the subject matter of Examples 1-6 includes, wherein at least one traffic control component of the plurality of traffic control components is internal to the enterprise system and at least one traffic control component of the plurality of traffic control components is a third-party traffic control component external to the enterprise system.

In Example 8, the subject matter of Examples 1-7 includes, blocking a request from the IP address at the firewall before the request reaches any of the plurality of traffic control components.

In Example 9, the subject matter of Examples 1-8 includes, wherein outputting the blocklist or the IP address entry in response to a request from the firewall includes outputting an update for the IP address entry corresponding to a change since a last sent version of the blocklist or a last sent update to the blocklist.

In Example 10, the subject matter of Examples 1-9 includes, receiving a manual override allowing access by the IP address, and in response, removing the IP address entry from the blocklist and preventing the IP address from being added back to the blocklist for at least a minimum time period.

Example 11 is an enterprise system for automated blocklist curating to manage a website comprising: a plurality of traffic control components to: filter incoming internet traffic, each traffic control component using a different internet protocol (IP) filtering algorithm to filter the incoming internet traffic; output risk factor scores for a particular IP address that was blocked by one of the plurality of traffic control components; an IP curator to: automatically aggregate the risk factor scores to determine whether to add the particular IP address to a blocklist; in response to a determination to add the particular IP address to the blocklist, generate an IP address entry in the blocklist for the particular IP address, the IP address entry including a corresponding time-based expiration; memory to store the blocklist; and a firewall to receive the blocklist on request.

In Example 12, the subject matter of Example 11 includes, wherein the IP curator is further to remove the IP address entry from the blocklist in response to completion of the corresponding time-based expiration.

In Example 13, the subject matter of Example 12 includes, wherein the IP curator is further to: receive second risk factor scores corresponding to the particular IP address at a second time; re-add, based on the second risk factor scores, the IP address entry to the blocklist for the particular IP address, including modifying the corresponding time-based expiration to increase time of the particular IP address on the blocklist.

In Example 14, the subject matter of Examples 12-13 includes, wherein the IP curator is further to, after removing the IP address entry from the blocklist, generate a parole entry in the blocklist for the particular IP address, the parole entry including a parole time, during which the IP address entry is automatically re-added to the blocklist in response to a security parameter trigger.

In Example 15, the subject matter of Example 14 includes, wherein a security parameter trigger includes at least one of one of the plurality of traffic control components blocking the IP address, one of the plurality of traffic control components indicating a risk factor score above a first threshold, an increase in traffic from the IP address, a failed authentication attempt from the IP address, or a cumulative risk factor score from the plurality of traffic control components above a second threshold.

In Example 16, the subject matter of Examples 11-15 includes, wherein to filter the incoming internet traffic, the plurality of traffic control components are further to filter the incoming internet traffic before authentication of a user at the website.

In Example 17, the subject matter of Examples 11-16 includes, wherein the risk factor scores include a risk factor score from at least one traffic control component that is a third-party traffic control component external to the enterprise system.

In Example 18, the subject matter of Examples 11-17 includes, wherein the firewall is further to block a request from the IP address before the request reaches any of the plurality of traffic control components when the IP address entry is in the blocklist.

In Example 19, the subject matter of Examples 11-18 includes, wherein to receive the blocklist on request, the firewall is to receive an update for the IP address entry corresponding to a change since a last received version of the blocklist or a last received update to the blocklist.

In Example 20, the subject matter of Examples 11-19 includes, wherein the IP curator is further to receive a manual override allowing access by the IP address, and in response, remove the IP address entry from the blocklist and prevent the IP address from being added back to the blocklist for at least a minimum time period.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method for automated blocklist curating at an enterprise system managing a website, the method comprising:
   filtering incoming internet traffic at a plurality of traffic control components, each traffic control component using a different internet protocol (IP) filtering algorithm for filtering the incoming internet traffic;
   outputting, from at least two of the plurality of traffic control components, risk factor scores for a particular IP address that was blocked by one of the plurality of traffic control components;
   automatically aggregating, at an IP curator, the risk factor scores to determine whether to add the particular IP address to a blocklist;
   in response to a determination to add the particular IP address to the blocklist, generating, at the IP curator, an IP address entry in the blocklist for the particular IP address, the IP address entry including a corresponding time-based expiration, the corresponding time-based expiration determined based on historical data related to the particular IP address; and
   outputting the blocklist or the IP address entry in response to a request from a firewall.

2. The method of claim 1, further comprising, removing, using the IP curator, the IP address entry from the blocklist in response to completion of the corresponding time-based expiration.

3. The method of claim 2, further comprising:
   receiving second risk factor scores corresponding to the particular IP address at a second time;
   re-adding, based on the second risk factor scores, the IP address entry to the blocklist for the particular IP address, including modifying the corresponding time-based expiration to increase time of the particular IP address on the blocklist.

4. The method of claim 2, further comprising, after removing the IP address entry from the blocklist, generating a parole entry in the blocklist for the particular IP address, the parole entry including a parole time, during which the IP address entry is automatically re-added to the blocklist in response to a security parameter trigger.

5. The method of claim 4, wherein a security parameter trigger includes at least one of one of the plurality of traffic control components blocking the IP address, one of the plurality of traffic control components indicating a risk factor score above a first threshold, an increase in traffic from the IP address, a failed authentication attempt from the IP address, or a cumulative risk factor score from the plurality of traffic control components above a second threshold.

6. The method of claim 1, wherein filtering the incoming internet traffic includes filtering incoming internet traffic using the plurality of traffic control components before authentication of a user at the website.

7. The method of claim 1, wherein at least one traffic control component of the plurality of traffic control components is internal to the enterprise system and at least one traffic control component of the plurality of traffic control components is a third-party traffic control component external to the enterprise system.

8. The method of claim 1, further comprising blocking a request from the IP address at the firewall before the request reaches any of the plurality of traffic control components.

9. The method of claim 1, wherein outputting the blocklist or the IP address entry in response to a request from the firewall includes outputting an update for the IP address entry corresponding to a change since a last sent version of the blocklist or a last sent update to the blocklist.

10. The method of claim 1, further comprising receiving a manual override allowing access by the IP address, and in response, removing the IP address entry from the blocklist and preventing the IP address from being added back to the blocklist for at least a minimum time period.

11. An enterprise system for automated blocklist curating to manage a website comprising:
a plurality of traffic control components to:
filter incoming internet traffic, each traffic control component using a different internet protocol (IP) filtering algorithm to filter the incoming internet traffic; and
output risk factor scores for a particular IP address that was blocked by one of the plurality of traffic control components;
an IP curator to:
automatically aggregate the risk factor scores to determine whether to add the particular IP address to a blocklist; and
in response to a determination to add the particular IP address to the blocklist, generate an IP address entry in the blocklist for the particular IP address, the IP address entry including a corresponding time-based expiration, the corresponding time-based expiration determined based on historical data related to the particular IP address;
memory to store the blocklist; and
a firewall to receive the blocklist from the memory on request.

12. The system of claim 11, wherein the IP curator is further to remove the IP address entry from the blocklist in response to completion of the corresponding time-based expiration.

13. The system of claim 12, wherein the IP curator is further to:
receive second risk factor scores corresponding to the particular IP address at a second time;
re-add, based on the second risk factor scores, the IP address entry to the blocklist for the particular IP address, including modifying the corresponding time-based expiration to increase time of the particular IP address on the blocklist.

14. The system of claim 12, wherein the IP curator is further to, after removing the IP address entry from the blocklist, generate a parole entry in the blocklist for the particular IP address, the parole entry including a parole time, during which the IP address entry is automatically re-added to the blocklist in response to a security parameter trigger.

15. The system of claim 14, wherein a security parameter trigger includes at least one of one of the plurality of traffic control components blocking the IP address, one of the plurality of traffic control components indicating a risk factor score above a first threshold, an increase in traffic from the IP address, a failed authentication attempt from the IP address, or a cumulative risk factor score from the plurality of traffic control components above a second threshold.

16. The system of claim 11, wherein to filter the incoming internet traffic, the plurality of traffic control components are further to filter the incoming internet traffic before authentication of a user at the website.

17. The system of claim 11, wherein the risk factor scores include a risk factor score from at least one traffic control component that is a third-party traffic control component external to the enterprise system.

18. The system of claim 11, wherein the firewall is further to block a request from the IP address before the request reaches any of the plurality of traffic control components when the IP address entry is in the blocklist.

19. The system of claim 11, wherein to receive the blocklist on request, the firewall is to receive an update for the IP address entry corresponding to a change since a last received version of the blocklist or a last received update to the blocklist.

20. The system of claim 11, wherein the IP curator is further to receive a manual override allowing access by the IP address, and in response, remove the IP address entry from the blocklist and prevent the IP address from being added back to the blocklist for at least a minimum time period.

* * * * *